J. B. ROOT.
APPARATUS FOR WASHING LIGHT OR FINELY PULVERIZED SUBSTANCES.
No. 188,190.   Patented March 6, 1877.
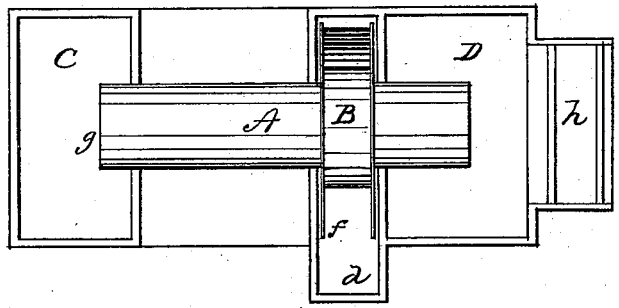
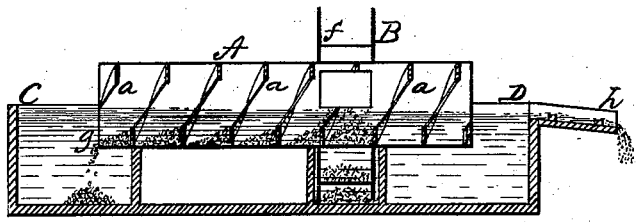
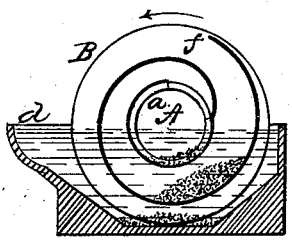

UNITED STATES PATENT OFFICE.

JOHN B. ROOT, OF GREEN POINT, NEW YORK.

IMPROVEMENT IN APPARATUS FOR WASHING LIGHT OR FINELY-PULVERIZED SUBSTANCES.

Specification forming part of Letters Patent No. 188,190, dated March 6, 1877; application filed July 26, 1875.

*To all whom it may concern:*

Be it known that I, JOHN B. ROOT, of Green Point, in the county of Kings and State of New York, have invented a new and Improved Apparatus for Purifying or Washing Light or Finely-Pulverized Substances; and that the following is a full, clear, and exact description of the same, reference being had to the accompanying drawings, and to the letters of reference marked thereon, making part of this specification.

This invention is in the nature of an improvement in apparatus for purifying or washing light or finely-pulverized substances; and the invention consists in the washing apparatus, constructed as and for the purpose hereinafter described.

In the accompanying sheet of drawings, Figure 1 is a plan or top view of my washing apparatus; Fig. 2, a longitudinal section, and Fig. 3 a transverse section of same.

Similar letters of reference indicate like parts in the several figures.

A represents a hollow cylinder, within which is formed or secured one or more spiral flanges or screw-threads, $a$, extending from one end to the other of the cylinder. Fitted to the cylinder A in any desired position, but preferably nearer one of its ends than the other, is a labyrinth or convoluted passage, B. One end of this passage opens into the cylinder A, and the other end opens outward. The cylinder A is supported in suitable bearings in such manner as will allow one of its ends to open into a receiving-tank, C, and the other of its ends to open into a discharge-tank, D, the labyrinth B being received into a feed-box, $d$. Now, water being admitted into the tank C, the material, having been first ground (if desired) into a fine powder, is mixed with water and inserted into the feed-box $d$. The cylinder A being caused to revolve by means of any suitable machinery, as the mouth $f$ of the labyrinth is brought in contact with the material in the feed-box, it scoops it up at each revolution, and it works its way through the passage into the interior of the cylinder A, where, being heavier than the water, it settles between the threads of the screw, and by its action, as this cylinder revolves, it is carried along and out of its end $g$ into the tank C of clear water, where it settles to the bottom. As it is forced along by the action of the screw, a current of water is allowed to flow through the cylinder A from the receiving-tank C into the discharging-tank D, producing a current which is opposed to its movement as it is advanced against it by the action of the screw-threads.

The motion of the cylinder on its axis should be governed to suit the material being treated. If it is very light relative to the water, the motion should be slow and gentle, so as not to create so much agitation as to cause the fine or light particles to be carried away by the water.

The current of water is maintained through the cylinder A by reason of the overflow $h$, through which the waste water passes, the flow of the current through the cylinder being regulated by the raising or lowering of this overflow-passage. The higher the water-level is carried in the tanks and through the cylinder, the weaker will be the current through the cylinder, and vice versa. Thus the current through the cylinder can be controlled so as to prevent the very fine material from being carried away. The height of this passage $h$ is regulated by a sliding gate. The water flowing through the cylinder, the refuse or coloring matter contained in the material, being lighter than the water, becomes mixed with it, and is carried with the current to the discharging-tank D, in which the heavier portion gravitates to the bottom, and from which it may be removed and otherwise treated, if desired.

That portion of the cylinder A which projects beyond the convoluted feed device B and into the discharging-tank D, by reason of its interior screw-threads, checks any of the material that might otherwise be carried through the cylinder to the tank D, acting in this particular as "riffles," and transferring it by the motion of the screw toward the opposite end of the cylinder.

The convoluted feed device is a very convenient means of introducing the material into or near the middle of the screw-cylinder A; but the same effect might be produced if they were so introduced by any other means.

The material that is deposited in the tank

C by the action of the screw is purified, the light refuse matter having been washed away by the water.

Having thus described my invention, what I claim as new, and desire to secure by Letters Patent, is—

1. The combination, in an apparatus for washing or purifying light or finely-pulverized substances, of a convoluted feed device, B, with a screw-cylinder, A, through which the material is fed, substantially as described.

2. The combination, with the screw-cylinder and convoluted feed device, of a water-tank constructed with an overflow having an adjustable gate, substantially as and for the purpose described.

3. In a machine for washing and purifying light or finely-pulverized substances, a cylinder with internal screw-threads, in combination with a receiving-tank at one end, and a discharging-tank at the other end, arranged as described, whereby the water-level of one or both tanks shall communicate and equalize through the interior of the cylinder, in the manner and for the purpose described.

JOHN B. ROOT.

Witnesses:
H. L. WATTENBERG,
G. M. PLYMPTON.